United States Patent
Peri et al.

(10) Patent No.: US 10,812,783 B1
(45) Date of Patent: Oct. 20, 2020

(54) MANAGING INFORMATION DISPLAY OF A DISPLAY SYSTEM

(71) Applicant: International Business Machines Corporation, Armonk, NY (US)

(72) Inventors: Madhav Peri, Austin, TX (US); Charles Paul Hofer, Austin, TX (US); James K. Wong, Austin, TX (US); Tony Sawan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/529,551

(22) Filed: Aug. 1, 2019

(51) Int. Cl.
| H04N 13/305 | (2018.01) |
| G09G 5/14 | (2006.01) |
| G06K 9/00 | (2006.01) |
| G02B 3/00 | (2006.01) |
| H04N 13/30 | (2018.01) |

(52) U.S. Cl.
CPC ........... *H04N 13/305* (2018.05); *G02B 3/005* (2013.01); *G06K 9/00288* (2013.01); *G06K 9/00597* (2013.01); *G09G 5/14* (2013.01); *G09G 2320/068* (2013.01); *G09G 2354/00* (2013.01); *G09G 2358/00* (2013.01); *H04N 2013/40* (2018.05)

(58) Field of Classification Search
CPC .. H04N 13/305; H04N 2013/40; G02B 3/005; G06K 9/00288; G06K 9/00302; G06K 9/00597; G09G 5/14; G09G 2320/068; G09G 2354/00; G09G 2358/00
See application file for complete search history.

(56) References Cited

U.S. PATENT DOCUMENTS

| 6,859,534 | B1 | 2/2005 | Alasia | |
| 9,824,241 | B2 | 11/2017 | Moore | |
| 10,105,982 | B2 | 10/2018 | Fuhse et al. | |
| 10,127,716 | B2 | 11/2018 | Gargus et al. | |
| 2002/0113866 | A1* | 8/2002 | Taniguchi | H04N 13/315 348/51 |
| 2013/0155377 | A1* | 6/2013 | Huang | H04N 13/359 353/7 |
| 2013/0342672 | A1 | 12/2013 | Gray et al. | |
| 2018/0096522 | A1* | 4/2018 | Gargus | H04N 13/383 |

FOREIGN PATENT DOCUMENTS

GB          2499634 A        8/2013

OTHER PUBLICATIONS

De Boer et al., "Switchable lenticular based 2D/3D displays," Proc. SPIE 6490, Stereoscopic Displays and Virtual Reality Systems XIV, 64900R, Mar. 2007, 8 pages.

* cited by examiner

*Primary Examiner* — William Boddie
*Assistant Examiner* — Saifeldin E Elnafia
(74) *Attorney, Agent, or Firm* — Yee & Associates, P.C.

(57) ABSTRACT

A method, apparatus, system, and computer program product for displaying information. A display system comprises a display device with pixels, a lenticular lens system, a sensor system, and a controller. The lenticular lens system is located on the pixels in the display device. The sensor system is positioned to detect a position of eyes of an authorized user with respect to the display device. The controller determines an authorized viewing angle of each lenticular lens to the eyes of the authorized user in the lenticular lens system using the position of the eyes of the authorized user and turns on a set of the pixels such that the authorized user sees information at the authorized viewing angle.

14 Claims, 7 Drawing Sheets

MANAGING INFORMATION DISPLAY OF A DISPLAY SYSTEM

BACKGROUND

1. Field

The disclosure relates generally to an improved computer system and more specifically to information displayed by the computer system. Still more particularly, the present disclosure relates to a method, apparatus, system, and computer program product for securely displaying information on a display device for a computer system.

2. Description of the Related Art

Computer security or cybersecurity is the protection of computer systems from unauthorized access or damage. The protection can be provided for many different aspects of computer systems including hardware, software, and data in computer systems.

One area of computer security involves privacy of information displayed on display devices. When the user is in a public space using a laptop computer for work, concerns can be present with respect to other people who may look over the user's shoulder to view confidential work information displayed by the computer. As another example, within an organization, selected users may be authorized to view information such as business plans or product designs while other users may not be authorized to view this information. This type of unauthorized viewing of the computer screen is also referred to as visual eavesdropping.

SUMMARY

According to one embodiment of the present invention, a display system comprises a display device with pixels, a lenticular lens system, a sensor system, and a controller. The lenticular lens system is located on the pixels in the display device. The sensor system is positioned to detect a position of eyes of an authorized user with respect to the display device. The controller determines an authorized viewing angle of each lenticular lens to the eyes of the authorized user in the lenticular lens system using the position of the eyes of the authorized user and turns on a set of the pixels such that the authorized user sees information at the authorized viewing angle.

According to another embodiment of the present invention, a method displays information. A determination is made, by a computer system, as to whether a user positioned relative to a display device is an authorized user. Responsive to the user being the authorized user, an authorized viewing angle of each lenticular lens in a lenticular lens system to eyes of the authorized user is determined by the computer system using a position of the eyes of the authorized user relative to the display device using sensor data received from a sensor system, wherein the lenticular lens system is located on pixels in the display device. A set of the pixels in the display device is controlled by the computer system such that the authorized user sees the information on the display device at the authorized viewing angle.

According to yet another embodiment of the present invention, a computer program product for displaying information comprises a computer-readable-storage media with first program code, second program code, and third program code stored on the computer-readable storage media. The first program code is executed to determine whether a user positioned relative to a display device is an authorized user. The second program code is executed to determine an authorized viewing angle of each lenticular lens in a lenticular lens system to eyes of the authorized user using a position of the eyes of the authorized user relative to the display device using sensor data received from a sensor system, wherein the lenticular lens system is located on pixels in the display device in response to the user being the authorized user. The third program code is executed to control a set of the pixels in the display device such that the authorized user sees the information on the display device at the authorized viewing angle.

DETAILED DESCRIPTION

Figure 1:
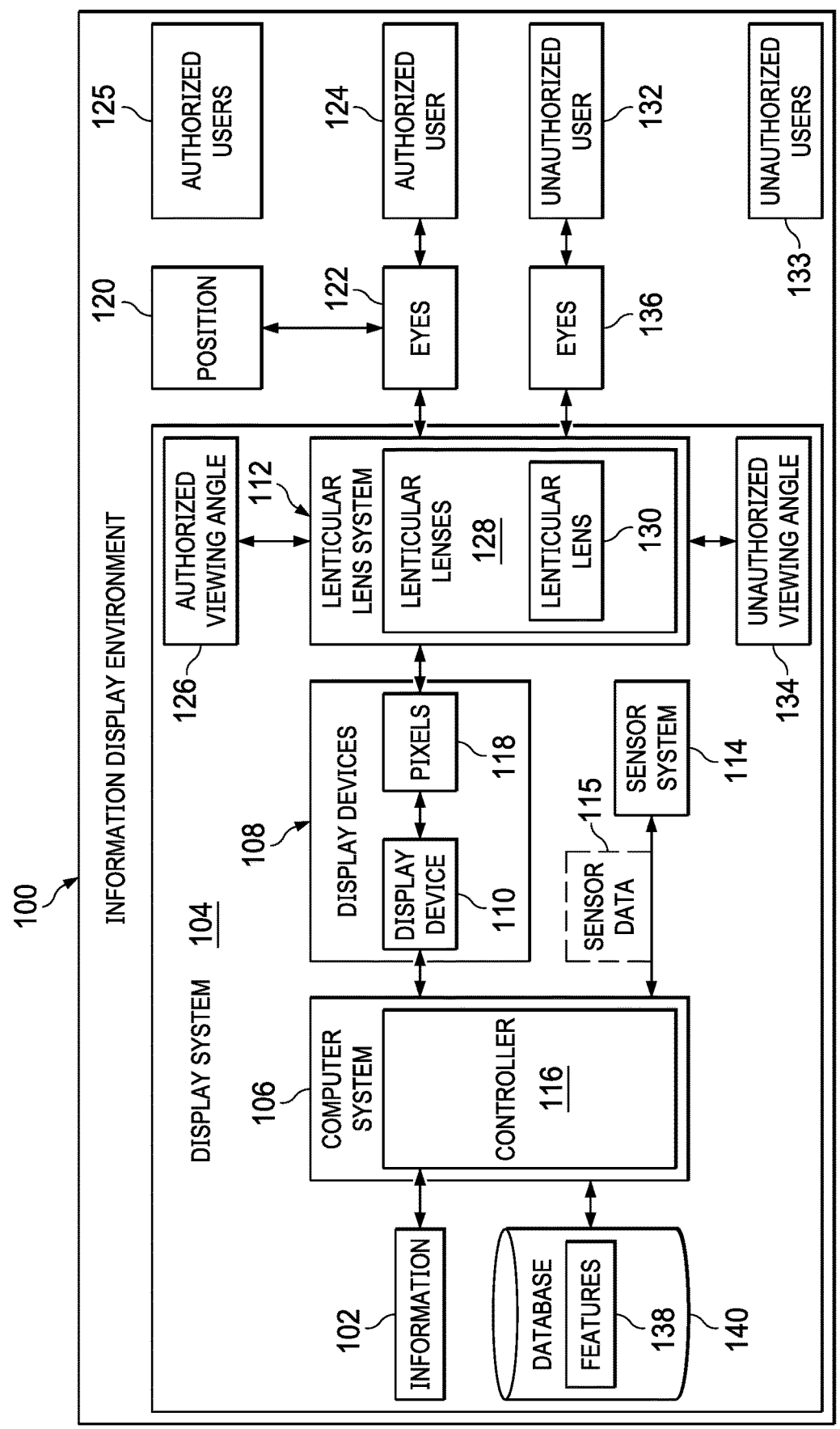
FIG. 1 is a block diagram of an information display environment in accordance with an illustrative embodiment.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that users with portable computers and other portable or handheld devices desire to safeguard data when using these devices in areas where unauthorized users may be present. The illustrative embodiments recognize and take into account that screen filters can be placed on display devices to reduce the ability of people other than the user from viewing a display screen. The illustrative embodiments also recognize and take into account that another solution involves using wearable devices such as smart glasses to view information. The illustrative embodiments also recognize and take into account that the information on the display device can be displayed in an encrypted form and specialized glasses can be worn by an authorized user that allows viewing the encrypted information. The illustrative embodiments recognize and take into account that these and other current mechanisms may not provide as much security as desired or may be more expensive than desired.

Thus, the illustrative embodiments provide a method, apparatus, system, and program code for displaying information. In one illustrative example, a determination is made, by a computer system, as to whether a user positioned relative to a display device is an authorized user. Responsive to the user being the authorized user, an authorized viewing angle of each lenticular lens in a lenticular lens system to eyes of the authorized user is determined by the computer system using a position of the eyes of the authorized user relative to the display device received from a sensor system. The lenticular lens system is located on pixels in the display device. A set of the pixels in the display device is controlled by the computer system such that the authorized user sees the information on the display device at the authorized viewing angle.

As used herein, a "set of" when used with reference to items means one or more items. For example, a set of pixels is one or more pixels.

With reference now to the figures and, in particular, with reference to FIG. 1, a block diagram of an information display environment is depicted in accordance with an illustrative embodiment. In this illustrative example, information display environment 100 is an environment in which information 102 can be securely displayed on display system 104 for computer system 106.

Information 102 can take a number of different forms. For example, information 102 can be selected from at least one of a document, a webpage, a spreadsheet, a computer-aided design model, a graph, a business plan, a license, a contract, a video, or some other suitable type of information.

Computer system 106 is a physical hardware system and includes one or more data processing systems. When more than one data processing system is present in computer system 106, those data processing systems are in communication with each other using a communications medium. The communications medium can be a network. The data processing systems can be selected from at least one of a computer, a server computer, a tablet computer, or some other suitable data processing system.

In this illustrative example, display system 104 is a physical hardware system and includes one or more of display devices 108. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information 102 for the visual presentation of information 102.

In this illustrative example, each data processing system in computer system 106 can be associated with one or more of display devices 108 to display information 102. As depicted, display device 110 is configured to provide for secure display of information 102. As depicted, display system 104 includes additional components such as lenticular lens system 112, sensor system 114, and controller 116 in display system 104 that can be used with display device 110 to display information 102 in a more secure manner as compared to currently used techniques.

As depicted, lenticular lens system 112 is a hardware system and is located on pixels 118 in display device 110. A pixel in pixels 118 is a physical addressable element from addressable elements for a display device. Pixels 118 are physical components arranged in rows and columns and can be controlled to display at least one of colors or shades of gray.

As depicted, lenticular lens system 112 can be located directly on pixels 118. In other illustrative examples, lenticular lens system 112 can be located on pixels 118 in which one or more other layers can be present between lenticular lens system 112 and pixels 118. For example, the layers can include at least one of a transparent layer, a filter, lens, or some other suitable type of layer.

In this illustrative example, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C, or item B and item C. Of course, any combinations of these items can be present. In some illustrative examples, "at least one of" can be, for example, without limitation, two of item A, one of item B, and ten of item C; four of item B and seven of item C; or other suitable combinations.

As depicted, lenticular lens system 112 is comprised of lenticular lenses 128. In this illustrative example, lenticular lens 130 in lenticular lenses 128 is a magnifying lens. For example, lenticular lens 130 can be a cylindrical lens having a truncated cylindrical shape. When viewed from different angles, different portions of pixels 118 under lenticular lens 130 can be seen.

Further, lenticular lenses 128 in lenticular lens system 112 can be arranged in various configurations. For example, lenticular lenses 128 can be arranged with different orientations and also may be arranged in layers.

In this illustrative example, sensor system 114 is a hardware system and can include software. As depicted, sensor system 114 is positioned to generate sensor data 115 for position 120 of eyes 122 of authorized user 124 with respect to display device 110. Sensor system 114 can include at least one of an eye tracker, a camera, or some other suitable type of device. In this illustrative example, sensor system 114 is configured to generate sensor data 115 for position 120 of eyes 122 such that an angle of a line or vector from an eye in eyes 122 to a location on a plane on display device 110 can be determined.

As depicted, sensor data 115 can be data used to determine position 120 or sensor data 115 can comprise position 120. The data used to determine position 120 can be images of eyes 122.

In this depicted example, the angle is authorized viewing angle 126 for authorized user 124. In this illustrative example, a location on the plane on display device 110 can be determined by the gaze of where authorized user 124 is looking. The location can be used to determine authorized viewing angle 126 for each of lenticular lenses 128 in lenticular lens system 112.

As depicted, controller 116 determines authorized viewing angle 126 of each lenticular lens in the lenticular lens system 112 to eyes 122 of authorized user 124 using position 120 of eyes 122 of authorized user 124. In this illustrative example, each lenticular lens 130 in lenticular lenses 128 in lenticular lens system 112 is at a different location on pixels 118 in display device 110. As a result, a line from the position of eyes 122 to a particular lenticular lens can have a different authorized viewing angle from another lenticular lens in lenticular lenses 128 located on pixels 118. In other words, each of lenticular lenses 128 can have a different value for authorized viewing angle 126 for authorized user 124.

In this illustrative example, controller 116 controls a set of pixels 118 such that authorized user 124 sees information 102 at authorized viewing angle 126. For example, controller 116 can control pixels 118 to display at least one of a color or a shade of gray in a manner that results in the display of information 102 at authorized viewing angle 126. In this example, the selection of the set of pixels 118 is based on enabling the set of pixels 118 to be seen by authorized user 124 with eyes 122 at authorized viewing angle 126 for lenticular lens 130.

In the illustrative example, different portions of an image under lenticular lens 130 can be seen viewed from different angles. Controller 116 controls pixels 118 such that information 102 displayed using the set of pixels is visible from authorized viewing angle 126 and not other viewing angles. Information 102 is not visible from other viewing angles other than authorized viewing angle 126.

In this illustrative example, controller 116 can also detect a presence of unauthorized user 132 from sensor data 115 received from sensor system 114. In this case, controller 116 determines unauthorized viewing angle 134 of each lenticular lens in lenticular lenses 128 in lenticular lens system 112 to eyes 136 of unauthorized user 132, and controls a second set of pixels 118 such that information 102 is unviewable by unauthorized user 132 at unauthorized viewing angle 134. The set of pixels 118 controlled by controller 116 for authorized viewing angle 126 is a first set of pixels 118. For example, controller 116 can control the second set of pixels 118 such that unauthorized user 132 may see a blank screen, random text or graphics, a message indicating that viewing information is prohibited by unauthorized user 132, or some other display or view other than information 102.

In this illustrative example, controller 116 can determine when unauthorized viewing angle 134 is the same as authorized viewing angle 126. In this case, controller 116 controls the first set of pixels 118 for authorized viewing angle 126 such that authorized user 124 is unable to see information 102 when unauthorized viewing angle 134 is the same as authorized viewing angle 126. In other words, the first set of pixels 118 is a second set of pixels 118. In this case, both authorized user 124 and unauthorized user 132 are blocked from viewing information 102 when the same viewing angle is shared by authorized user 124 and unauthorized user 132.

In this illustrative example, the value of a viewing angle can be more than one degree. For example, a viewing angle can be a range of degrees. Thus, if the values for authorized viewing angle 126 overlap the values for unauthorized viewing angle 134, controller 116 can control the first set of pixels 118 in a manner that does not display information 102 even though authorized user 124 is present. In this manner, viewing of information 102 by unauthorized user 132 can be prevented when the values for the viewing angles between the two users are the same or overlap.

Controller 116 can determine whether authorized user 124 is present using a number of different processes. For example, controller 116 can process images received from sensor system 114 using at least one of facial recognition, retinal recognition, iris recognition, or other techniques to determine whether authorized user 124 is present.

The images can be processed to determine a set of features for authorized user 124. In one illustrative example, controller 116 can store the set of features 138 for authorized user 124 in database 140. This database stores the set of features for registered users. As depicted, different registered users can be authorized for different types or sets of information.

Features 138 are attributes on the face of a person in this illustrative example. The features can be, for example, at least one of eyes, ears, a scar, iris, skin color, a pore pattern, or other features that can be used to determine the identity of a person. The set of features 138 can be used identify a presence of authorized user 124 at display device 110. Images received from sensor system 114 can be processed to determine features 138 of a person in the images. These features from the images can be compared to a set of features 138 for authorized user 124. If authorized user 124 is not identified from features 138 in the images received from sensor system 114, the user is determined to be unauthorized user 132. In another illustrative example, controller 116 can affirmatively determine the presence of unauthorized user 132 rather than relying on an inability to detect authorized user 124.

Controller 116 can be implemented in software, hardware, firmware or a combination thereof. When software is used, the operations performed by controller 116 can be implemented in program code configured to run on hardware, such as a processor unit. When firmware is used, the operations performed by controller 116 can be implemented in program code and data and stored in persistent memory to run on a processor unit. When hardware is employed, the hardware may include circuits that operate to perform the operations in controller 116.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Although this example depicts authorized user 124 and unauthorized user 132, the illustrative example can be applied when at least one of a set of authorized users 125 and a set of unauthorized users 133 are present that can view display device 110 in addition to authorized user 124 and unauthorized user 132. When authorized users 125 and a set of unauthorized users 133 view other display devices in display devices 108, controller 116 can control the display of these devices in a similar fashion when the other display devices also include lenticular lens systems.

Figure 2:
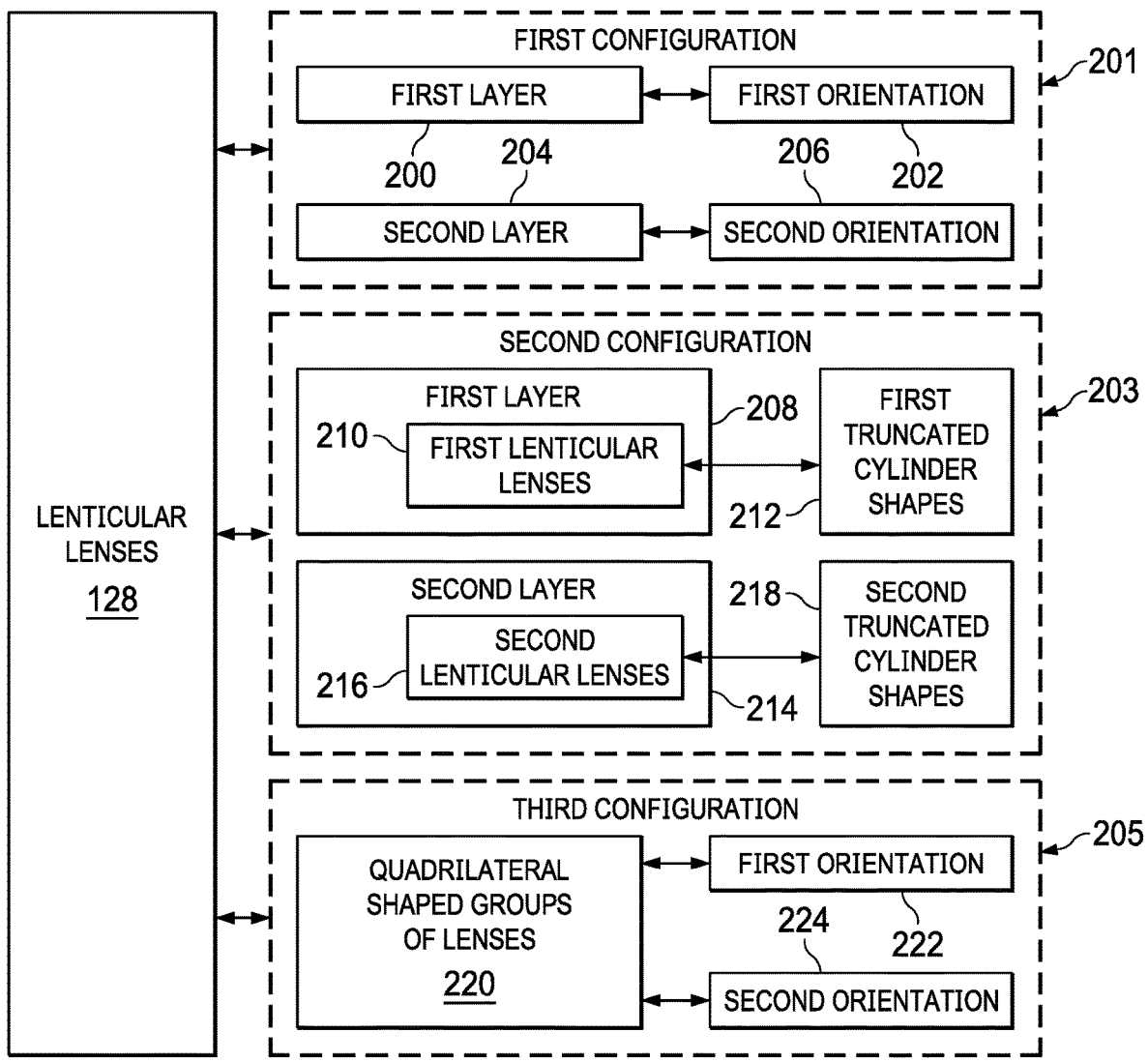
FIG. 2 is a block diagram of configurations for a lenticular lens system in accordance with an illustrative embodiment.

With reference next to FIG. 2, a block diagram of configurations for a lenticular lens system is depicted in accordance with an illustrative embodiment. In the illustrative examples, the same reference numeral may be used in more than one figure. This reuse of a reference numeral in different figures represents the same element in the different figures.

In this illustrative example, lenticular lenses 128 in lenticular lens system 112 in FIG. 1 can have a number of different configurations. Further, the dimensions of lenticular lenses 128 can be selected such that each individual lens covers a selected number of rows and columns of pixels 118 in FIG. 1. The selection of the dimensions in the group of lenticular lenses 128 can be selected to limit the viewing of pixels 118 in two orthogonal directions, such as along an x-axis and a y-axis on a plane defined by pixels 118.

Lenticular lenses 128 can be grouped into blocks. The lenses in a given block are pointed in the same direction or they can be in different directions within a block. For example, the lenticular lenses can be truncated cylinders with all of the lenses in a block arranged in the same direction. The block of lenticular lenses can be a layer or could be section for rectangles in a checkboard pattern in a layer. In the illustrative example, a truncated cylinder is a cylinder that is cut by a plane not parallel to the base. In this illustrative example, a truncated cylinder has a cross-section in the shape of a semicircle. The ends of the cylinders can have a variety shapes depending on the particular design.

The selection of at least one of the dimensions and orientations of lenticular lenses 128 can be such that a user will only see certain pixels in the group of pixels 118 under a lenticular lens based on the viewing angle of the user. Other pixels that are in a different angle cannot be seen. In the illustrative example, the viewing angle can be a single value or a range of values. The range of values can be, for example, a range of 5 degrees, 8 degrees, 10 degrees or some other range of values depending on the particular implementation.

As depicted in first configuration 201, lenticular lenses 128 comprise first layer 200 of lenticular lenses 128 in first orientation 202. Lenticular lenses 128 also comprises second layer 204 of lenticular lenses 128 in second orientation 206. As depicted, second orientation 206 is orthogonal to first orientation 202.

In another illustrative example, lenticular lenses 128 in second configuration 203 comprise first layer 208 of first lenticular lenses 210. As depicted, first lenticular lenses 210 have first truncated cylinder shapes 212. Lenticular lenses 128 further comprise second layer 214 of second lenticular lenses 216 located on first layer 208 of first lenticular lenses 210 in which second lenticular lenses 216 have second truncated cylinder shapes 218 that are orthogonal to first truncated cylinder shapes 212 of first lenticular lenses 210 in first layer 208. In other words, different layers of lenticular lenses 128 can have different shaped lenses.

In this illustrative example, first configuration 201 and second configuration 203 are examples of two layers stacked together with different orientations. In other illustrative examples, one or more additional layers can be present with different orientations in addition to first layers and second layers shown in first configuration 201 and second configuration 203.

In yet another illustrative example, in third configuration 205, lenticular lenses 128 comprise quadrilateral shaped groups of lenses 220 having first orientation 222 and second orientation 224 that is orthogonal to first orientation 222. In this illustrative example, a quadrilateral shaped lens in quadrilateral shaped groups of lenses 220 comprises lenticular lenses 128 that are grouped in a layer that has a quadrilateral shape. The quadrilateral shaped groups of lenses 220 are arranged in orientations that form a checkerboard configuration in third configuration 205.

As depicted, quadrilateral shaped groups of lenses 220 are arranged in a layer having m rows and n columns with the first orientation and the second orientation as follows:

$f(m,n)$=first orientation if $m+n$ is even second orientation if $m+n$ is odd.

In the illustrative example, lenticular lenses 128 can be arranged at any m interval of horizontal orientation and any n interval of vertical orientation. The orientation of lenticular lenses 128 forms a checkerboard pattern with respect to the placement of lenticular lenses 128 using first orientation 222 and second orientation 224.

In one illustrative example, one or more solutions are present that overcome a problem with providing a desired level of security when displaying information on display devices. As a result, one or more technical solutions may provide a technical effect of displaying information such that an authorized user at an unauthorized viewing angle is able to view the information on the display device while an unauthorized user at another view is unable to view the information.

The illustration of information displayed in an environment in FIG. 1 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more authorized users can be present in addition to authorized user 124. When more than one authorized user is present, controller 116 can control the selection of the set of pixels 118 such that information 102 can be viewed by both authorized users from their respective authorized viewing angles. Further, controller 116 can control pixels 118 such that different authorized users can see different portions of information 102 or different information depending on the clearance for authorization that each authorized user has for viewing information 102. As another example, one or more additional layers of lenticular lenses can be used in addition to first layer 200 and second layer 204 in FIG. 2.

In the illustrative examples, lenticular lenses 128 are comprised of truncated cylinders. A truncated cylinder is a cylinder that is cut by a plane not parallel to the base. In this illustrative example, a truncated cylinder has a cross-section in the shape of a semicircle. The ends of the truncated cylinders can have a variety shapes depending on the particular design. For example, the ends of these truncated cylinders for lenticular lenses 128 can have shapes a truncated shape, a curved shape, a sloped shape, or some other suitable shape.

Figure 3:
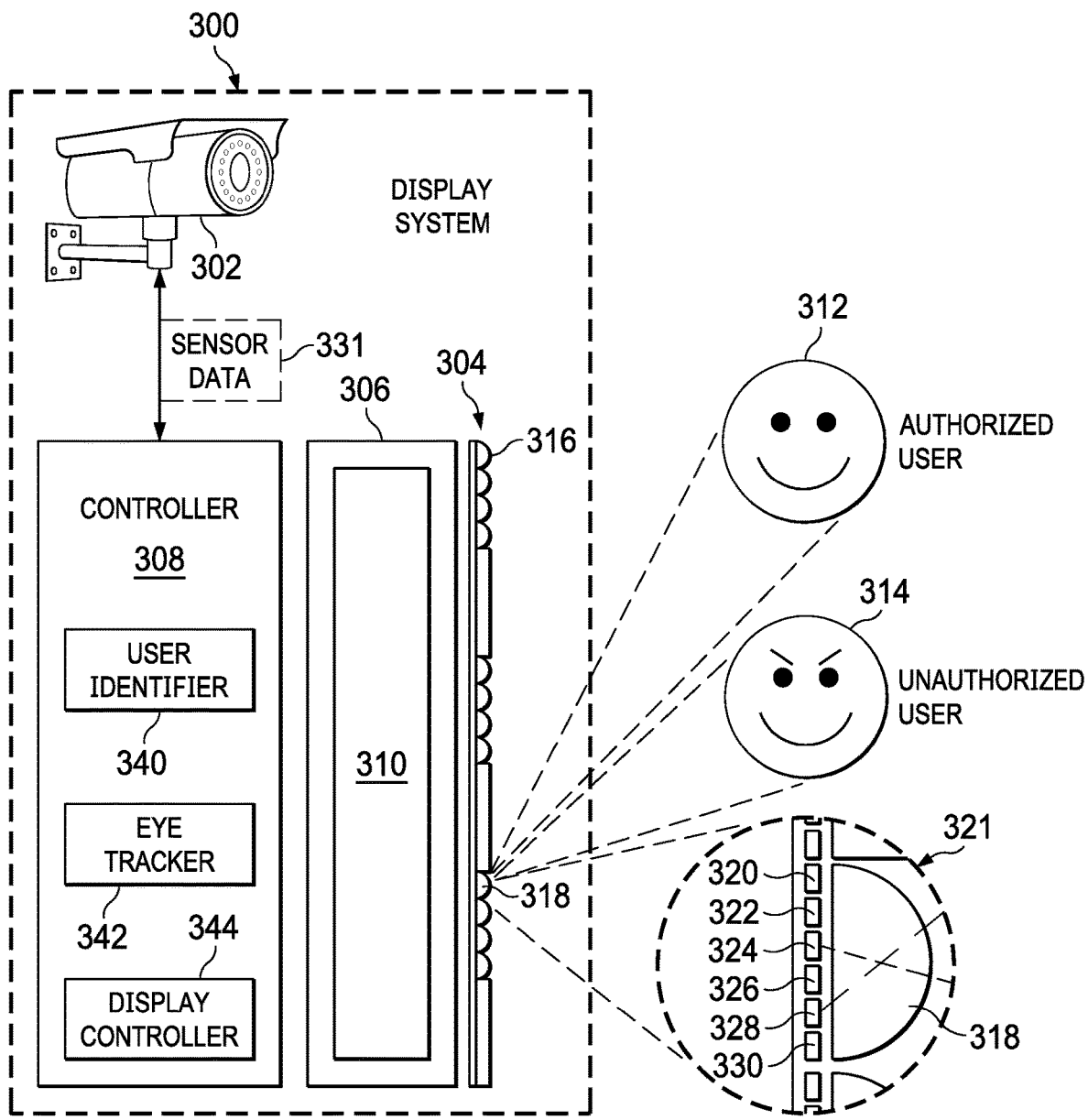
FIG. 3 is a pictorial illustration of a display system providing a secure display of information in accordance with an illustrative embodiment.

With reference next to FIG. 3, a pictorial illustration of a display system providing a secure display of information is depicted in accordance with an illustrative embodiment. In this illustrative example, display system 300 is an example of an implementation for display system 104 shown in block form in FIG. 1.

In this illustrative example, display system 300 includes a number of different components. As depicted, display system 300 comprises camera 302, lenticular lens system 304, display device 306, and controller 308.

As depicted, display device 306 includes pixels 310 which are used to display information. Lenticular lens system 304 is configured to allow different pixels in pixels 310 to be viewed at different viewing angles. Lenticular lens system 304 includes lenticular lenses 316 that are arranged in a configuration, such as third configuration 205 in FIG. 2.

In this illustrative example, camera 302 is configured to generate sensor data 331 that can be used by controller 308 to determine whether a user is an authorized user. Sensor data 331 can also be used by controller 308 to track items as part of determining the position or gaze of the eyes of users located where they can view display device 306.

In this depicted example, authorized user 312 and unauthorized user 314 are located in front of display device 306. In determining the position of the eyes of authorized user 312 relative to display device 306, the determination can take into account the relative depth or distance from the display device 306 to the eyes of authorized user 312 in determining which ones of pixels 310 should be controlled to display information to authorized user 312.

Controller 308 controls which pixels for the set of pixels 310 that are used to display information based on the viewing angle for authorized user 312. For example, lenticular lens 318 is shown in an enlarged view in section 321. In this enlarged view, pixel 320, pixel 322, pixel 324, pixel 326, pixel 328, and pixel 330 in pixels 310 are located under lenticular lens 318. Controller 308 can select one or more of these pixels for use in displaying information.

In this illustrative example, controller 308 is an example of an implementation for controller 116 shown in block form in FIG. 1. In this example, controller 308 includes user identifier 340, eye tracker 342, and display controller 344.

User identifier 340 can use the images in sensor data 331 from camera 302 and determine whether a user is authorized user 312. The images can be processed to identify features such as features 138 in FIG. 1. Those features obtained from the images in sensor data 331 can be stored in a database, such as database 140 in FIG. 1. For example, a determination can be made by comparing features of a user in the image with corresponding features in a database of registered users. The features of the user can be, for example, at least one of the eyes, nose, or other facial features.

If the user in the images in sensor data 331 is authorized user 312, display controller 344 can receive a viewing angle for the user from eye tracker 342. In this illustrative example, eye tracker 342 determines the viewing angle for the eyes of authorized user 312 in the images in sensor data 331 received from camera 302. Display controller 344 selects a set of pixels 310 that should be used to display information to authorized user 312. This process can be repeated any number of times for authorized user 312 to take into account movement by authorized user 312 that changes the viewing for authorized user 312.

In this illustrative example, the selection of particular pixels is based on the viewing angle for authorized user 312. As depicted, pixel 328 is selected to be activated to display information to authorized user 312. This pixel is selected because pixel 328 can be seen through lenticular lens 318 by authorized user 312 at the viewing angle for authorized user 312.

As depicted, the other pixels do not display information. In this illustrative example, pixel 324 can be seen by unauthorized user 314 through lenticular lens 318 from the viewing angle of unauthorized user 314. Knowing this viewing angle, pixel 324 can be controlled to display other information to unauthorized user 314. For example, a message for indication that accesses is unauthorized can be displayed by controlling pixels that can be seen by unauthorized user 314.

In another illustrative example, unauthorized user 314 is not authorized to view the information displayed to authorized user 312 but can be another authorized user that is authorized to view other information that is different from the information displayed to authorized user 312. As result, a second set of pixels 310 including pixel 328 can be selected to display this information for viewing.

The illustration of display system 300 in FIG. 3 is provided for purposes of illustrating one manner in which display system 104 shown in block form in FIG. 1 can be implemented. This illustration is not meant to limit the manner in which other display systems can be implemented in accordance with an illustrative example. For example, other configurations can be used for lenticular lens system 304 other than the checkerboard configuration shown in this figure.

Figure 4:
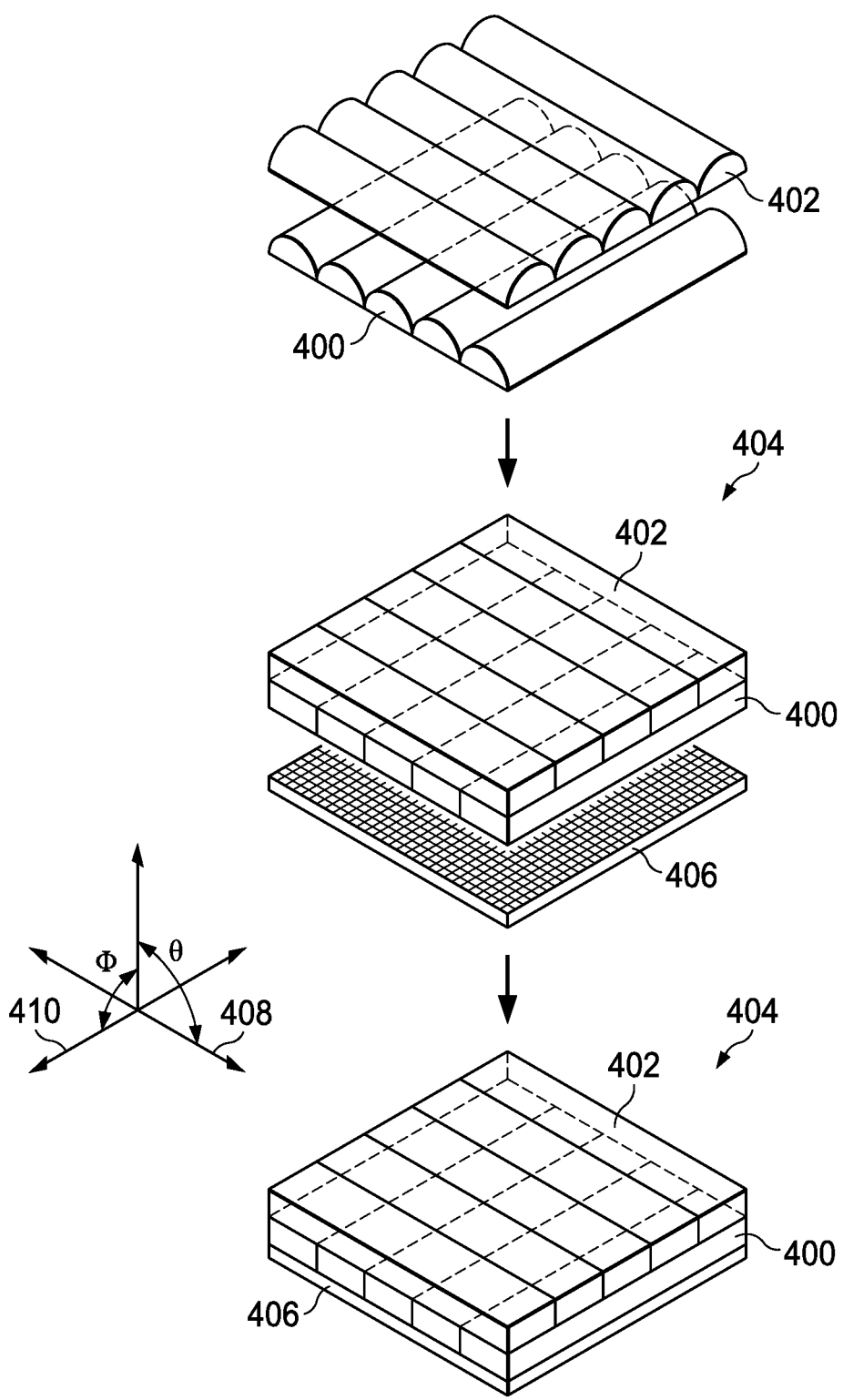
FIG. 4 is an illustration of a configuration of lenticular lenses using multiple layers in accordance with an illustrative embodiment.

With reference next to FIG. 4, an illustration of a configuration of lenticular lenses using multiple layers is depicted in accordance with an illustrative embodiment. In this illustrative example, first layer of lenticular lenses 400 is positioned under second layer of lenticular lenses 402 such that truncated cylinders for first layer of lenticular lenses 400 are orthogonal to the truncated cylinders for second layer of lenticular lenses 402.

These two layers form lenticular lens system 404 which is positioned over pixels 406. Lenticular lens system 404 is an example of an implementation for lenticular lens system 112 shown in block form in FIG. 1. These layers are also an example of first configuration 201 in FIG. 2.

In this manner, the viewing of information displayed can be controlled based on angle theta ($\theta$) in the direction of x-axis 408 and angle phi ($\phi$) in the direction of y-axis 410 defining a viewing angle an authorized user. The viewing angle can be used to select pixels 406 that can be seen for the viewing angle of the authorized user.

Figure 5:
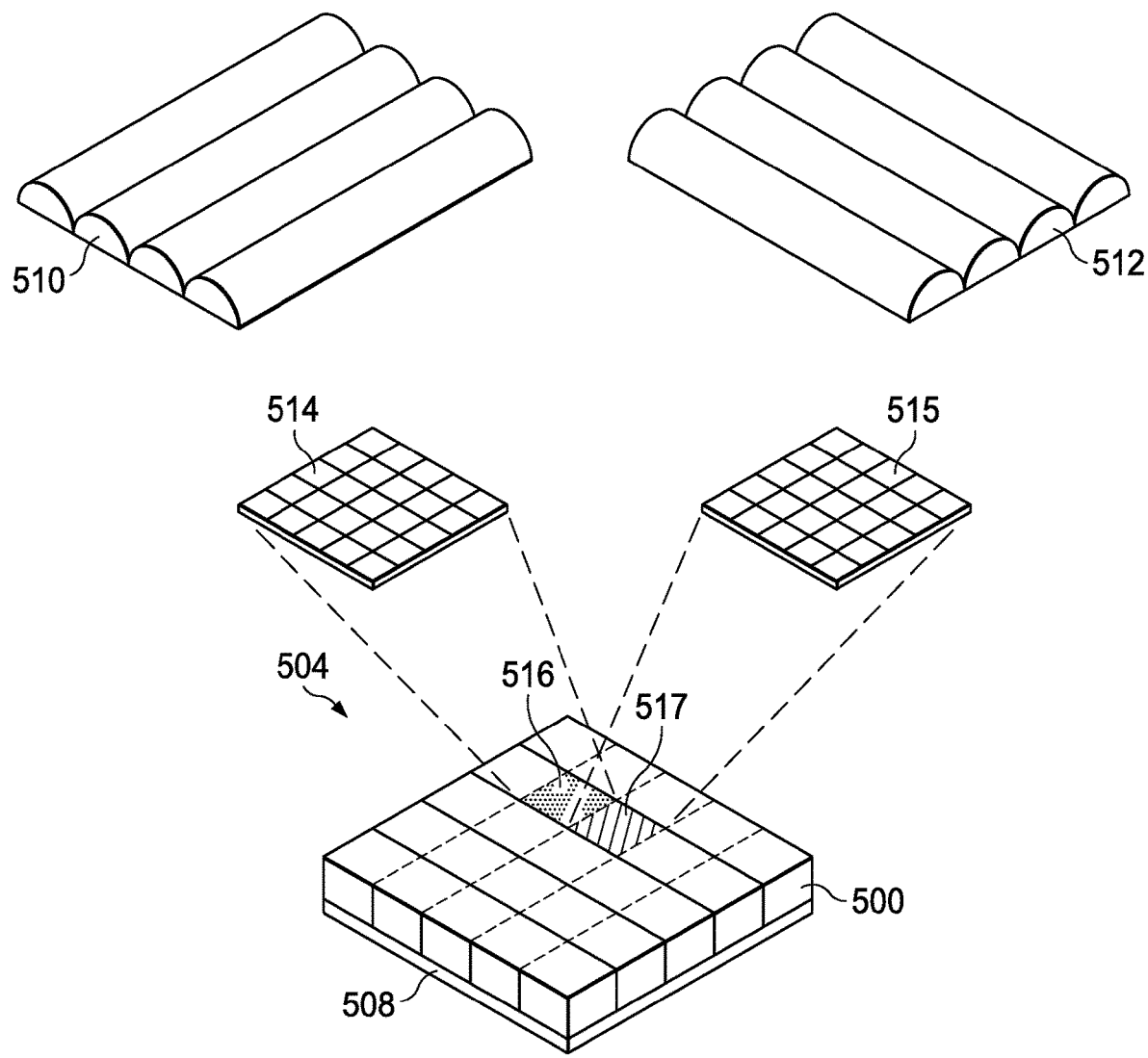
FIG. 5 is an illustration of lenticular lenses in a checkerboard configuration in accordance with an illustrative embodiment.

Turning to FIG. 5, an illustration of lenticular lenses in a checkerboard configuration is depicted in accordance with an illustrative embodiment. As depicted, layer of lenticular lenses 500 form lenticular lens system 504. Lenticular lens system 504 is an example of an implementation for lenticular lens system 112 shown in block form in FIG. 1. Lenticular lens system 504 is located over pixels 508.

In this illustrative example, a checkerboard pattern is present in which the orientation of lenticular lenses within a layer of lenticular lenses is such that the lenticular lenses within the layer of lenticular lenses have a first orientation and a second orientation that is orthogonal to the first orientation. The quadrilateral shaped groups of lenses form the squares in the checkerboard pattern. The quadrilateral shaped groups of lenses in this example are arranged in a layer having m rows and n columns of quadrilateral shaped groups of lenses with the first orientation and the second orientation defined as follows:

$f(m,n)$=first orientation if $m+n$ is even second orientation if $m+n$ is odd.

Further, this checkerboard pattern is configured such that lenticular lenses 510 in layer of lenticular lenses 500 in section 516 form a quadrilateral shaped group of lenses and are orthogonal to lenticular lenses 512 in layer of lenticular lenses 502 that form another quadrilateral shaped group of lenses in section 517. As can be seen in the exploded views of section 516 and section 517, these two sets of lenticular lenses have a truncated cylinder shape with orientations that are orthogonal to each other. Further, these two lenticular lenses are located over pixels 514 in pixels 508 and pixels 515 in pixels 508 as depicted in this exploded view of section 516 and section 517.

The illustrations of the arrangement of lenticular lens in FIG. 4 and FIG. 5 are not meant to limit the manner in lenticular lenses can be arranged or grouped in other illustrative examples. The arrangement of lenticular lenses can take other forms other than a checkerboard pattern or layers. The lenticular lenses can be grouped and arranged in other patterns such as a hexagon shape in a hexagonal grid. The shapes of a group of lenticular lenses can take other forms such as a diamond, a semi-circle, or some other suitable shape in addition to or in place of the quadrilateral shaped groups of lenses shown in this figure.

Further, the arrangement of lenticular lenses can be selected based on the area or section in which the lenticular lenses are located on a display device. Further, lenticular lenses can have at least one of a shape, a length, or a width that can vary depending on a particular implementation. The selection can be based on controlling at least one of a viewing angle, a range of values for the viewing angle, a distance from which information can be viewed, an intensity of information displayed, or other suitable factors.

For example, lenticular lenses can have different lengths in addition to or in place of different arrangements. Thus, at least one of an arrangement, a length, a width, a grouping, or a shape of lenticular lenses can be selected to ensure information is viewed in a desired manner by an authorized user and unviewable by an unauthorized user.

Figure 6:
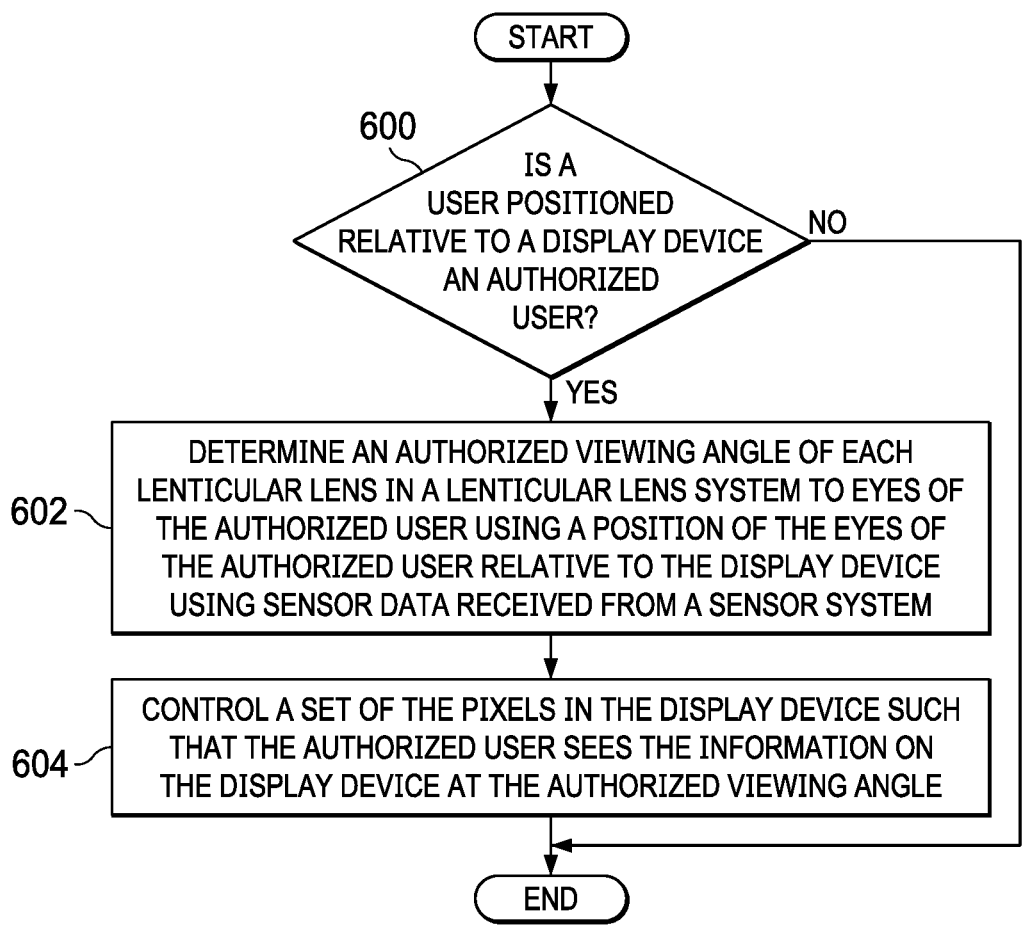
FIG. 6 is a flowchart of a process for displaying information in accordance with an illustrative embodiment.

Turning next to FIG. 6, a flowchart of a process for displaying information is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process can be implemented in controller 116 in computer system 106 in FIG. 1.

The process can be used to control pixels in the display device used to display information in which the pixels selected to display information are based on the location of those pixels under lenticular lenses and the viewing angle of an authorized user.

The process begins by determining whether a user positioned relative to a display device is an authorized user (step 600). In step 600, the process can determine whether a user positioned relative to a display device is an authorized user performing at least one of facial recognition, retinal recognition, iris recognition, or other techniques for determining if the user is the authorized user. In the depicted example, the determination can be performed using images received in sensor data from a sensor system such as a camera. The facial recognition can be performed using features identified in the images with features for authorized users stored in a database.

Responsive to the user being the authorized user, the process determines an authorized viewing angle of each lenticular lens in a lenticular lens system to eyes of the authorized user using a position of the eyes of the authorized user relative to the display device using sensor data received from a sensor system (step 602). The sensor data can comprise the position of the eyes or can be data, such as images, that can be used to determine the position of the eyes. In step 602, the lenticular lens system is located on pixels in the display device.

The process controls a set of pixels in the display device such that the authorized user sees the information on the display device at the authorized viewing angle (step 604). The process terminates thereafter.

With reference again to step 600, if the user is not an authorized user, the process also terminates. In this depicted example, the detection of the unauthorized user can result in initiating the process described in FIG. 7 below.

Figure 7:
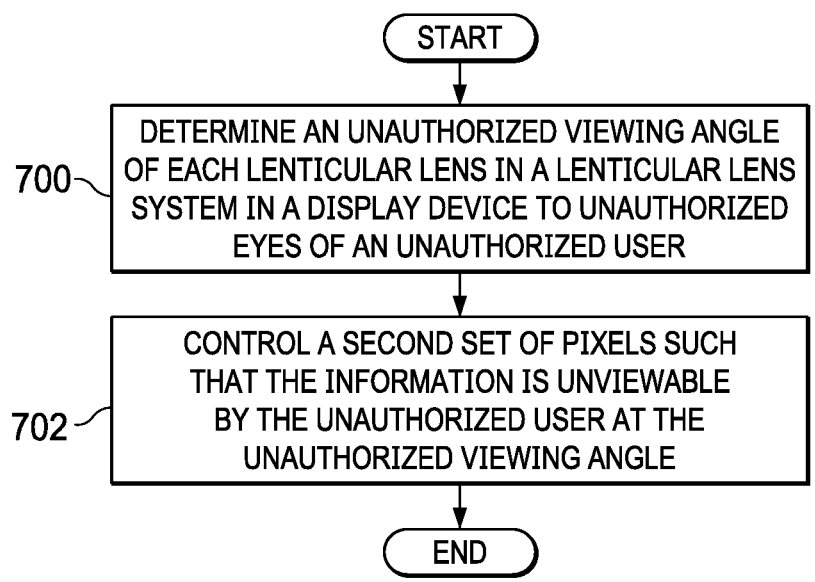
FIG. 7 is a flowchart of a process for controlling pixels viewable by an unauthorized user in accordance with an illustrative embodiment.

With reference now to FIG. 7, a flowchart of a process for controlling pixels viewable by an unauthorized user is depicted in accordance with an illustrative embodiment. The process in FIG. 7 can be implemented in hardware, software, or both. When implemented in software, the process can take the form of program code that is run by one or more processor units located in one or more hardware devices in one or more computer systems. For example, the process can be implemented in controller 116 in computer system 106 in FIG. 1. The process illustrated in FIG. 7 can be initiated when an unauthorized user is detected such as in step 600 in FIG. 6.

The process begins by determining an unauthorized viewing angle of each lenticular lens in a lenticular lens system in a display device to unauthorized eyes of an unauthorized user (step 700). The process controls a second set of pixels such that information is unviewable by the unauthorized user at the unauthorized viewing angle (step 702). The process terminates thereafter. The second set of pixels is different from the first set of pixels controlled to enable the unauthorized user to view the information. In step 702, the pixels can be controlled to be uniformly dark, a neutral color, or some type of code. In other illustrative examples, the set of pixels can be controlled to display a message indicating that the user is not authorized to view the information.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 8:
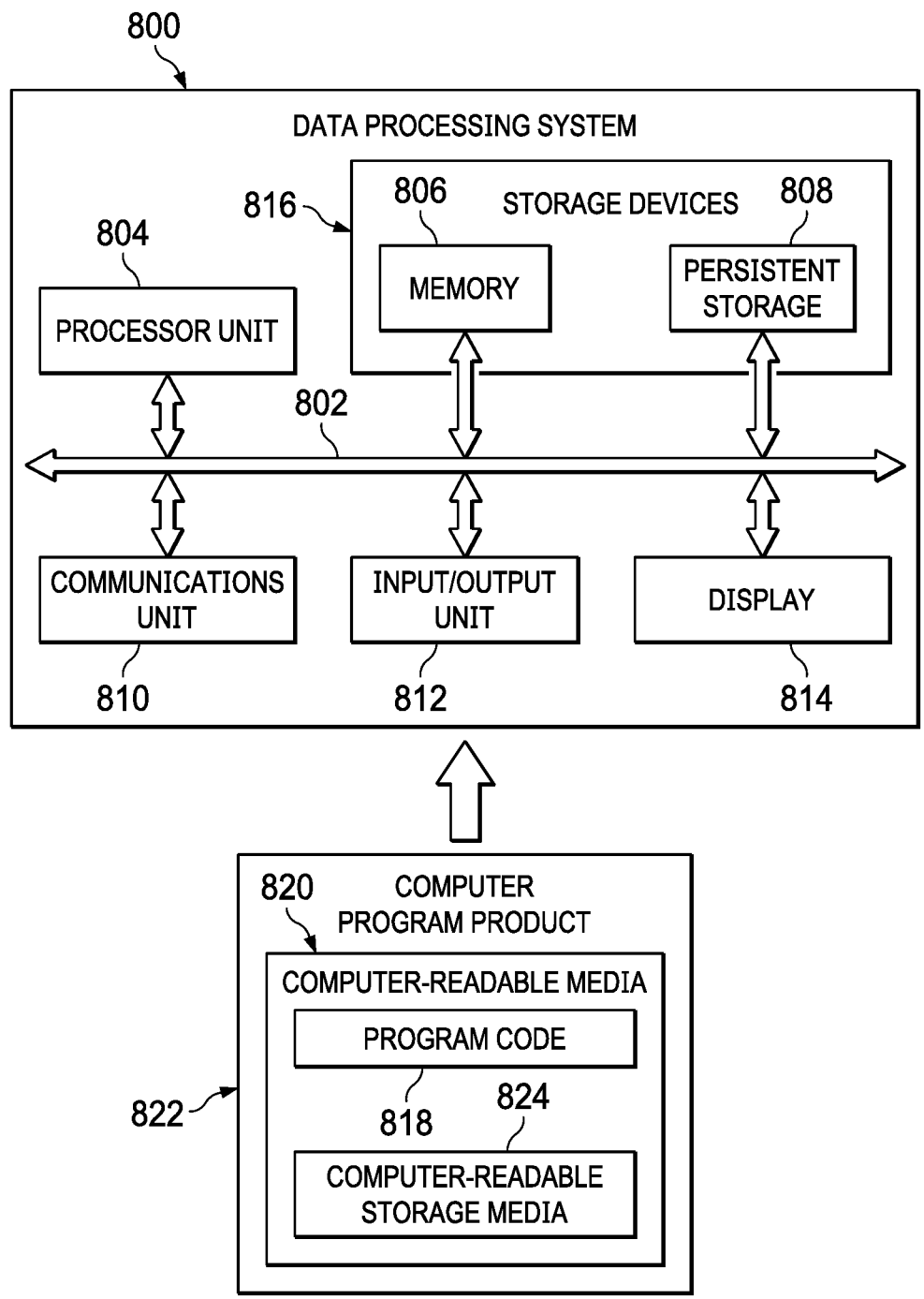
FIG. 8 is a block diagram of a data processing system in accordance with an illustrative embodiment.

Turning now to FIG. 8, a block diagram of a data processing system is depicted in accordance with an illustrative embodiment. Data processing system 800 can be used to implement computer system 106 in FIG. 1. In this illustrative example, data processing system 800 includes communications framework 802, which provides communications between processor unit 804, memory 806, persistent storage 808, communications unit 810, input/output (I/O) unit 812, and display 814. In this example, communications framework 802 takes the form of a bus system.

Processor unit 804 serves to execute instructions for software that can be loaded into memory 806. Processor unit 804 includes one or more processors. For example, processor unit 804 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 804 can may be implemented using one or more heterogeneous processor systems in which a main processor is present with secondary processors on a single chip. As another illustrative example, processor unit 804 can be a symmetric multi-processor system containing multiple processors of the same type on a single chip.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, can be, for example, a random-access memory or any other suitable volatile or non-volatile storage device. Persistent storage 808 may take various forms, depending on the particular implementation.

For example, persistent storage 808 may contain one or more components or devices. For example, persistent storage 808 can be a hard drive, a solid-state drive (SSD), a flash memory, a rewritable optical disk, a rewritable magnetic tape, or some combination of the above. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs can be located in storage devices 816, which are in communication with processor unit 804 through communications framework 802. The processes of the different embodiments can be performed by processor unit 804 using computer-implemented instructions, which may be located in a memory, such as memory 806.

These instructions are referred to as program code, computer usable program code, or computer-readable program code that can be read and executed by a processor in processor unit 804. The program code in the different embodiments can be embodied on different physical or computer-readable storage media, such as memory 806 or persistent storage 808.

Program code 818 is located in a functional form on computer-readable media 820 that is selectively removable and can be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818.

Alternatively, program code 818 can be transferred to data processing system 800 using a computer-readable signal media. The computer-readable signal media can be, for example, a propagated data signal containing program code 818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 800 are not meant to provide architectural limitations to the manner in which different embodiments can be implemented. In some illustrative examples, one or more of the components may be incorporated in or otherwise form a portion of, another component. For example, memory 806, or portions thereof, may be incorporated in processor unit 804 in some illustrative examples. The different illustrative embodiments can be implemented in a data processing system including components in addition to or in place of those illustrated for data processing system 800. Other components shown in FIG. 8 can be varied from the illustrative examples shown. The different embodiments can be implemented using any hardware device or system capable of running program code 818.

Thus, the illustrative embodiments of the present invention provide a computer implemented method, apparatus, system, and computer program product for displaying information. In one illustrative example, a display system comprises a display device with pixels, a lenticular lens system, a sensor system, and a controller. The lenticular lens system is located on the pixels in the display device. The sensor system is positioned to detect a position of eyes of an authorized user with respect to the display device. The controller determines an authorized viewing angle of each lenticular lens to the eyes of the authorized user in the lenticular lens system using the position of the eyes of the authorized user and turns on a set of the pixels such that the authorized user sees information at the authorized viewing angle.

Thus, the information seen by a user is controlled using a display device in which a lenticular lens system overlays pixels in the display device. With the lenticular lens system, a lenticular lens overlays multiple pixels and pixels are selected from the multiple pixels such that only the selected pixels are viewable from a viewing angle of the user in relation to the display device. The information seen by the user can be controlled by selecting the set of pixels in locations based on the viewing angle of the user. The controller determines a gaze of the eyes of the authorized user to identify a viewing angle of each lens in the particular lens system. The set of pixels can be selected such that the user can see the pixels through the lenticular lens system at the viewing angle. Other users at other viewing angles who are not authorized are unable to view the information displayed to the authorized user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:
1. A display system comprising:
    a display device with pixels;
    a lenticular lens system located on the pixels in the display device, wherein the lenticular lens system includes a plurality of quadrilateral shaped groups of lenses within a same layer arranged in a checkerboard pattern having m numbers of rows and n numbers of columns, each respective quadrilateral shaped group of lenses in the checkerboard pattern within the same layer having a first orientation when an m number row plus an n number column equals an even number and having a second orientation orthogonal to the first orientation when the m number row plus the n number column equals an odd number;

a sensor system positioned to generate sensor data for a position of eyes of an authorized user with respect to the display device; and a controller that determines an authorized viewing angle of each lenticular lens in the lenticular lens system to the eyes of the authorized user using the position of the eyes of the authorized user determined from the sensor data and turns on a set of the pixels such that the authorized user sees information at the authorized viewing angle.

2. The display system of claim 1, wherein the set of the pixels is a first set of the pixels and wherein the controller determines an unauthorized viewing angle of each lenticular lens to unauthorized eyes of an unauthorized user and controls a second set of the pixels such that the information is unviewable by the unauthorized user at the unauthorized viewing angle.

3. The display system of claim 2, wherein the controller controls the first set of the pixels for the authorized viewing angle such that the authorized user is unable to see the information when an unauthorized viewing angle is the authorized viewing angle and the first set of the pixels is the second set of the pixels.

4. The display system of claim 1, wherein the controller uses at least one of facial recognition, retinal recognition, or iris recognition.

5. The display system of claim 1, wherein the controller stores a set of features of the authorized user in a database, wherein the set of features and are used to identify a presence of the authorized user at the display device.

6. A method for displaying information, the method comprising:

determining, by a computer system, whether a user positioned relative to a display device is an authorized user;

responsive to the user being the authorized user, determining, by the computer system, an authorized viewing angle of each lenticular lens in a lenticular lens system to eyes of the authorized user using a position of the eyes of the authorized user relative to the display device using sensor data received from a sensor system, wherein the lenticular lens system is located on pixels in the display device, and wherein the lenticular lens system includes a plurality of quadrilateral shaped groups of lenses within a same layer arranged in a checkerboard pattern having m numbers of rows and n numbers of columns, each respective quadrilateral shaped group of lens in the checkerboard pattern within the same layer having a first orientation when an m number row plus an n number column equals an even number and having a second orientation orthogonal to the first orientation when the m number row plus the n number column equals an odd number; and controlling, by the computer system, a set of the pixels in the display device such that the authorized user sees the information on the display device at the authorized viewing angle.

7. The method of claim 6, wherein the set of the pixels is a first set of the pixels and further comprising:

determining, by the computer system, an unauthorized viewing angle of each lenticular lens in the lenticular lens system in the display device to unauthorized eyes of an unauthorized user; and controlling, by the computer system, a second set of the pixels such that the information is unviewable by the unauthorized user at the unauthorized viewing angle.

8. The method of claim 7 further comprising:

controlling, by the computer system, the first set of the pixels for the authorized viewing angle such that the authorized user does not see the information when an unauthorized viewing angle is the authorized viewing angle and the first set of the pixels is the second set of the pixels.

9. The method of claim 6, wherein determining, by the computer system, whether the user positioned relative to the display device is the authorized user comprises:

determining, by the computer system, whether the user positioned relative to the display device is the authorized user using at least one of facial recognition, retinal recognition, or iris recognition.

10. The method of claim 6 further comprising:

storing, by the computer system, a set of features of the authorized user in a database, wherein the set of features is used to identify a presence of the authorized user at the display device.

11. A computer program product for displaying information, the computer program product comprising:

a computer-readable storage media;

first program code, stored on the computer-readable storage media, for determining whether a user positioned relative to a display device is an authorized user;

second program code, stored on the computer-readable storage media, responsive to the user being the authorized user, for determining an authorized viewing angle of each lenticular lens in a lenticular lens system to eyes of the authorized user using a position of the eyes of the authorized user relative to the display device using sensor data received from a sensor system, wherein the lenticular lens system is located on pixels in the display device, and wherein the lenticular lens system includes a plurality of quadrilateral shaped groups of lenses within a same layer arranged in a checkerboard pattern having m numbers of rows and n numbers of columns, each respective quadrilateral shaped group of lens in the checkerboard pattern within the same layer having a first orientation when an m number row plus an n number column equals an even number and having a second orientation orthogonal to the first orientation when the m number row plus the n number column equals an odd number; and third program code, stored on the computer-readable storage media, for controlling a set of the pixels in the display device such that the authorized user sees the information on the display device at the authorized viewing angle.

12. The computer program product of claim 11, wherein the set of the pixels is a first set of the pixels and further comprising:

fourth program code, stored on the computer-readable storage media, for determining an unauthorized viewing angle of each lenticular lens in the lenticular lens system in the display device to unauthorized eyes of an unauthorized user; and fifth program code, stored on the computer-readable storage media, for controlling a second set of the pixels such that the information is unviewable by the unauthorized user at the unauthorized viewing angle.

13. The computer program product of claim 12 further comprising:
fourth program code, stored on the computer-readable storage media, for controlling the first set of the pixels for the authorized viewing angle such that the authorized user does not see the information when an unauthorized viewing angle is the authorized viewing angle and the first set of the pixels is the second set of the pixels.

14. The computer program product of claim 11, wherein the second program code comprises:
program code, stored on the computer-readable storage media, for determining whether a user positioned relative to the display device is the authorized user using at least one of facial recognition, retinal recognition, or iris recognition.

* * * * *